United States Patent Office 3,355,458
N-ALKENYL PYROGLUTAMIC ACID AMIDES,
SALTS AND 1,1' METHYLENE BIS-(ALLYL PYROGLUTAMATES) THEREOF
Frederick M. Meigs, Westfield, Albert L. Micchelli, Middletown, David Wasserman, Springfield, and John D. Garber, Westfield, N.J., assignors to Merck & Co., Inc., Rahway, N.J., a corporation of New Jersey
No Drawing. Filed Apr. 16, 1964, Ser. No. 360,405
17 Claims. (Cl. 260—326.3)

This invention relates to novel monomers and polymers and to methods for producing them, and also to novel reaction products produced therewith and to novel compositions of matter in which one or a combination of two or more of said monomers, polymers and/or reaction products are components thereof. In one of its more specific aspects the invention is directed to novel monomers producible from pyroglutamic acid which is old and well known, and is also known as 5-carboxy-2-pyrrolidone and is of the following formula:

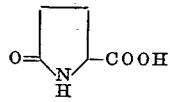

The novel and unique monomers of this invention are compounds within the following generic formulas:

IA

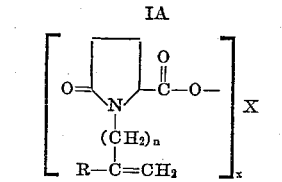

IIA

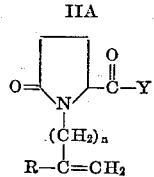

IIIA

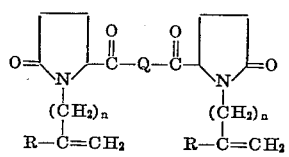

IVA

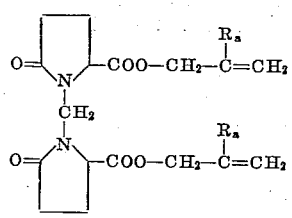

each $n$ is independently selected from the group consisting of 0 and 1; when $n$ is 0, R is hydrogen; when $n$ is 1, each R is independently selected from the group consisting of hydrogen and methyl; each $R_a$ is independently selected from the group consisting of hydrogen and methyl. X is selected from the group consisting of (1) a cation and (2) a hydrocarbon radical, with (1) being selected from the group consisting of (a) hydrogen, (b) ammonium, (c) protonated amine radicals and (d) the metals of the Groups I, II and III of the Periodic Table of Elements, and especially sodium, potassium, lithium, silver, calcium, magnesium, barium, mercury, aluminum, iron, zinc, nickel, manganese and chromium. When X is (2), (a) or (b), $x$ is 1; when X is (c), $x$ is an integer equal to the sum of the primary and secondary amine nitrogens in (c); and when X is (d), $x$ is an integer equal to the valency of (d). When X is hydrogen, the compound is an N-alkenyl pyroglutamic acid. When X is $NH_4$, the compound is an N-alkenyl ammonium pyroglutamate. When X is a metal, the compound is an N-alkenyl metal pyroglutamate salt. When X is a hydrocarbon radical, the compound is an N-alkenyl hydrocarbyl pyroglutamate. However, when X is a protonated amine radical, X', the compound is ionic and is an amine addition salt of an N-alkenyl pyroglutamic acid which salt may be more specifically depicted by the following formula:

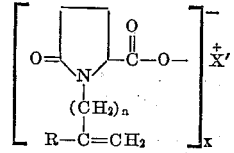

The amines which are employed for the production of said amine addition salts are the strongly basic amines, some examples of which are morpholine, methyl amine, ethyl amine, ethanolamine, ethylene diamine, and other strongly basic polyamines.

Examples of some of said radicals (2) are the branched and straight chain alkyl radicals, e.g. methyl, ethyl, butyl, t-butyl, t-amyl, octyl, octadecyl, etc., alkenyl radicals containing one or more ethylenic linkages therein, e.g. allyl, methallyl, crotonyl, etc., cycloalkyl radicals, e.g. cyclobutyl, cyclopentyl, cyclohexyl, etc., aromatic radicals, e.g. phenyl, tolyl, xylyl, etc., aromatic-aliphatic, e.g. benzyl, phenyl, ethyl, etc., aliphatic-aromatic, e.g. methyl phenyl, allyl benzyl, ethyl phenyl.

Y is $-NH_2$ or the radical of a primary and/or secondary amine characterized by being said compound except that it lacks a hydrogen which was originally attached to an amine nitrogen thereof which now is directly attached to the

group attached to the ring of Formula IIA. Examples of some of said radicals are $-NHNH_2$, $-NHR_1$, $-N(R_1)_2$, $-NHNHCONH_2$
$-NHR_2NH_2$, $-NHR_2NHR_1$, $-NHR_2NHR_2NH_2$
$-NHOH$, $-NHR_2NH(R_2OH)$ with $R_1$ being a hydrocarbon radical having a maximum of 18 carbon atoms and preferably alkyl of 1–18 carbon atoms, and each $R_2$ being independently selected from the group consisting of a divalent saturated hydrocarbon group of 2–4 carbon atoms, such as

All of said compounds of Formula IIA are amides of N-alkenyl pyroglutamic acid.

Q is a bivalent radical of a compound having at least two amine radicals, either or both of which is a primary or secondary amine radical and characterized by being said compound except that a hydrogen of two amine nitrogens have been eliminated and said nitrogens are connected directly to the carbonyl groups attached to the two rings of the compound as shown in Formula IIIA. Examples of some of said radicals are

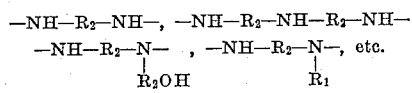

with $R_1$ and $R_2$ being as before defined. All of said compounds of Formula IIIA are diamides of (N-alkenyl pyroglutamic acid) and may also be defined as bis (N-alkenyl pyroglutamic acid) diamide.

All of said compounds of Formula IVA are diallyl, dimethallyl or mixed allyl and methallyl esters of 1,1'-methylene bis-pyroglutamic acid depending upon whether both of the Ra radicals are allyl or methallyl radicals or one of them is the allyl radical and the other is the methallyl radical.

The monomeric compounds of this invention may be prepared by following a number of different routes of reaction.

One of the methods which may be employed is to produce the novel N-vinyl hydrocarbyl pyroglutamates of this invention by transvinylating hydrocarbyl pyroglutamates with an alkyl vinyl ether in the presence of a suitable catalyst. The vinyl ethers which may be used are those containing alkyl groups of 1–10 carbon atoms; but the vinyl ether which is preferably employed is ethyl vinyl ether. The catalysts which may be used are the mercury and zinc salts of a weak acid, such as a carboxylic acid, which in water imparts a pKa value of about 4–7, and preferably one which is soluble or dispersible in the reaction mixture.

Examples of some of them are mercuric benzoate, zinc acetate, phenyl mercuric acetate, mercuric acetate, the last being the most preferred.

The transvinylation is preferably carried out in a nonreactive solvent, characterized by having no active hydrogen atoms, such as dioxane, dimethyl formamide, or ethers of ethylene glycol or diethylene glycol. The reaction temperatures used were 130°–170° C., but 140°–150° C. are preferred; and the reactions were carried out under a nitrogen blanket in a rocking autoclave for 16 hours.

One of the unique features in the process for the production of various N-vinyl monomers of this invention is the employment of hindered phenol type anti-oxidants to prevent the polymerization of the vinyl alkyl ether reactants employed as well as the N-vinyl hydrocarbyl pyroglutamates produced in the course of reaction. Although nonactive hydrogen containing anti-oxidants may be used, it is preferable that there be used hindered phenols, examples of which are 2,2'-methylene bis (4-methyl-6-t-butyl phenol), 2,6 dietrtiary butyl paracresol and others in which the phenolic hydroxyl group is sterically hindered. No detectable vinylation of the hindered phenol occurred. Said anti-oxidants are employed in both the reaction and in the distillation steps for stabilization in those steps whereby high yields of the monomers are obtained.

While the aforesaid transvinylation reaction is a safe method of vinylation easily adaptable to laboratory preparations, other methods may be used for the production of the novel monomeric N-vinyl hydrocarbyl pyroglutamates of this invention. One of these other methods is to directly vinylate the hydrocarbyl pyroglutamates. This may be effected by the direct vinylation with acetylene in the presence of N-sodium or potassium salt of the hydrocarbyl pyroglutamates at temperatures in the range of 100°–150° C., under pressure by a batch procedure. Alternatively, continuous addition systems may be used in which the acetylene is passed into a solution at room temperature of hydrocarbyl pyroglutamate containing a low proportion of its N-sodium and/or N-potassium salts, with or without unreactive solvents. This is then forced into and through a heating coil wherein it is maintained at 150°–230° C. and 1000–5000 pounds per square inch pressure for a period of ½ to 10 minutes to complete the reaction. Still another method of such direct vinylation may be achieved by reacting the hydrocarbyl pyroglutamates with a vinyl halide, such as vinyl bromide or vinyl chloride. The reaction is conducted in the presence of a molar equivalent of sodium hydroxide and copper chromate-ferric chloride catalyst.

Still another method which may be employed for the production of the novel N-vinyl hydrocarbyl pyroglutamates of this invention is to react a hydrocarbyl pyroglutamate with acetaldehyde and then dehydrate the resultant compound to the N-vinyl hydrocarbyl pyroglutamate.

The other N-alkenyl hydrocarbyl pyroglutamates of this invention may be produced by reacting sodium methylate with a hydrocarbyl pyroglutamate in methanol solvent thereby to produce the N-sodio salt of the hydrocarbyl pyroglutamate employed. Then dimethyl formamide solvent is added to said reaction mass and this is followed by the removal of the methanol therein by distillation. Then to said mass, consisting of the sodio salt of the hydrocarbyl pyroglutamate suspended in the dimethyl formamide, is slowly added 1.7 molar equivalents of allyl or methallyl chloride while maintaining the mass at 40°–45° C. Then after the last increment of allyl or methallyl chloride has been added, the mass is maintained in said temperature range for 3 hours. The reaction mixture is filtered to separate out the NaCl reaction by-product and the filtrate is recovered and subjected to vacuum distillation to strip off the solvent leaving behind the N-allyl or methallyl pyroglutamate so produced, which may be subsequently purified.

The methyl and ethyl esters of N-vinyl pyroglutamic acid are water soluble and butyl, octyl and stearyl esters are not. Those esters of Formula IA wherein X is methyl, ethyl, butyl or octyl are all liquid at room temperature, whereas those in which X is of longer chain such as stearyl are solids.

The N-alkenyl sodium and potassium salts of pyroglutamic acid may be produced by hydrolyzing an N-alkenyl hydrocarbyl pyroglutamate with dilute sodium or potassium hydroxide in dilute ethanol for example to provide the sodium or potassium salt. Other metal salts may be likewise produced by employing other available hydroxides of the metals of Groups I, II and III of the Periodic Table of Elements.

N-alkenyl pyroglutamic acid may be produced by treating N-alkenyl sodium or potassium pyroglutamate with concentrated hydrochloric acid. And, N-alkenyl pyroglutamic acid may be neutralized by reaction with oxides or hydroxides of metals of Groups I, II and III of the Periodic Table of the Elements to provide the N-alkenyl corresponding metal pyroglutamate; also N-alkenyl pyroglutamic acid may be neutralized by reaction with appropriate basic nitrogen compounds such as ammonium hydroxide, thereby to provide the N-alkenyl ammonium pyroglutamate salt.

The N-alkenyl pyroglutamic acid amine addition salts may be produced by adding sufficient of the amine to an alcoholic solution of said acid to raise the pH to about 8 and then precipitating out the amine addition salt with ether.

N-alkenyl pyroglutamide may be obtained by reacting an N-alkenyl hydrocarbyl pyroglutamate with ammonia ($NH_3$).

N-alkenyl pyroglutamic acid hydrazide and semi-carbazide may be produced by reacting hydrazine and semicarbazone respectively, with an N-alkenyl hydrocarbyl pyroglutamate.

Other amides may be obtained by reaction of various other primary and/or secondary amines which may be monoamines, diamines and other polyamines with an N-alkenyl hydrocarbyl pyroglutamate, or N-alkenyl pyroglutamic acid.

The diamides of N-alkenyl pyroglutamic acid may be produced by reacting 1 mole of a diamine or polyamine with 2 moles of an N-alkenyl hydrocarbyl pyroglutamate or N-vinyl pyroglutamic acid.

The 1,1′ methylene bis-(allyl or methallyl pyroglutamate) may be produced by reacting 2 moles of allyl alcohol or methallyl alcohol with 1 mole of 1,1′ methylene bis-pyroglutamic acid; and the mixed allyl and methallyl ester of 1,1′ methylene bis-pyroglutamic acid may be produced by reacting 1 mole of 1,1′ methylene bis-pyroglutamic acid with a mixture of 1 mole of allyl alcohol and 1 mole of methallyl alcohol in the presence of a suitable acidic catalyst.

In another one of its specific aspects this invention is directed to novel polymers which may be produced with the monomeric compounds of this invention. The novel polymers are addition polymers and may be either (1) homopolymers of any of the individual novel monomers or (2) copolymers of two or more of said novel mnomers or (3) copolymers of at least one, that is one or more of said novel monomers and at least one, that is one or more ethylenically unsaturated cmpounds other than those of Formulas IA–IVA, examples of which are styrene, vinyl toluene, acrylonitrile, vinyl chloride, vinylidene chloride, methyl acrylate, ethyl acrylate, and other monomeric acrylates and methacrylates, vinyl acetate, vinyl propionate, maleic anhydride and other olefins characterized by containing a

group, and other examples of which are N-vinyl-5-phenyl-2-oxazolidinone, N-vinyl cyclic amides and carbamates and other N-vinyl compounds disclosed in U.S. Patent 2,891,058 issued to W. E. Walles et al. on June 16, 1959, N-vinyl-lactams, some of which are disclosed in the U.S. Patent 2,856,338 issued to F. Grosser on Oct. 14, 1958.

Because each of the rings of the novel monomers are C-substituted by a radical having a

group connected directly to the carbon in the 5 position thereof and because each of the rings thereof is N-substituted by a radical containing a terminal ethylenic linkage

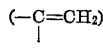

the monomers as well as the polymers of this invention represent a unique class of chemical compositions, some of which are water-soluble, others are water-insoluble, some are ionic and others are non-ionic. This unique class of chemical compositions finds uses in a number of different and unrelated fields. The monomers are useful as intermediates for the production of homopolymers and copolymers of widely different and special and unique properties. In addition those monomers, such as the ammonium and the alkali metal salts, such as the sodium, potassium and lithium salts of N-vinyl pyroglutamic acid as well as other monomers such as the methyl and ethyl esters of N-vinyl pyroglutamic acid, which are water-soluble are useful in the laundering, cleansing and other fields. The water-soluble polymers are useful as soil-suspending agents or as aids in soil-suspension in aqueous media, as laundering components to prevent or aid in the prevention of redeposition of dirt particles in the course of laundering, and also as aids in the suspension of finely divided carbon, particles, pigments, clays, silica and the like in aqueous media and also as aids to reduce dusting of detergent compositions in powdered, pellet, flake, or tablet form and also as thickeners for aqueous compositions. Some of the monomers of this invention, and especially those containing at least 2 ethylenic sites per molecular are useful as upgraders for highly saturated oils, such as soya bean and other oils of low degree of unsaturation, thereby to make them useful in combination therewith and a catalyst, such as ABIN, as heat curable lacquers and varnishes. Some of the polymers of this invention are thermoplastic and others are thermosetting and all of them with or without appropriate fillers may be produced in situ as encapsulators or as set products in molds from the monomers together with a catalyst and heat. Those which are water-insoluble find application as soil and carbon precipitating agents in aqueous media and also find application as impregnating and coating agents for paper and fabrics composed of synthetic and/or natural fibers, such as glass, cotton, silk, nylon, Dacron, etc. fibers. The compositions of this invention also find use as selective solvents for organic gases, are combinable with polymers which are compatible therewith to increase their dyeability and are useful in the spinning of synthetic fibers and in petroleum products. The monomers of this invention may be copolymerized with other monomers of this invention and/or with other monomers which are copolymerizable therewith and have a

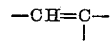

group therein to provide copolymers of different degrees of polarity and to provide thermoplastic and thermosetting copolymers. Also, the homopolymers and copolymers of the novel monomers may be copolymerized with other monomers having a

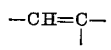

group therein to provide still other copolymers. We have discovered that when a minor proportion of an N-vinyl alkyl pyroglutamate whose alkyl group is at least 4 carbon atoms and therefore is water insoluble is copolymerized with a major proportion of an N-vinyl alkyl pyroglutamate whose alkyl group is less than 4 carbon atoms and is water soluble that the resulting copolymers are water insoluble notwithstanding the high proportion of the normally water soluble units therein. This unusual result may be achieved by employing as little as about 5 parts of the former to about 95 parts of the latter. A water insoluble copolymer was produced when 94 parts of N-vinyl methyl pyroglutamate was copolymerized with only 6 parts of N-vinyl butyl pyroglutamate. Predicated upon this discovery, it is possible to obtain a great many different water insoluble copolymers containing up to about 95% of normally water-soluble units. The monomeric hydrazides of this invention as well as the polymers produced therewith may be reacted with diacid chlorides, e.g. the diacid chlorides of succinic acid, adipic acid, sebacic acid, etc. whereby cross linking occurs to provide a variety of reaction products, useful as chelating agents for metals such as copper, nickel and iron and for curing the new type of water emulsifiable epoxy resins. The polyvinyl methyl pyroglutamates and its copolymers with polyvinyl pyrrolidone form hard water-soluble films which have good adhesion to glass and metal surfaces; they find application as hair sprays for hair setting in definite patterns and are capable of being washed out with aqueous shampoos when desired.

The compounds of Formula IVA are especially useful as upgraders for soya bean oil and other low unsaturated vegetable oils to the performance of at least linseed oil thereby making them useful in the fields of paints, varnishes and lacquers.

An object of this invention is to provide novel derivatives of pyroglutamic acid.

Another object of this invention is to provide novel polymers, which may be either homopolymers or copolymers of novel derivatives of pyroglutamic acid.

Another object of this invention is to provide copolymers of at least one of the novel derivatives of pyroglutamic acid and at least one other compound having a —CH=C< group therein and being capable of copolymerization therewith.

A further object of this invention is to provide novel reaction products produced by reacting said novel derivatives of pyroglutamic acid, or the polymers produced therewith with various other reactants.

A further object of this invention is to provide compounds within the generic Formulas IA–IVA as hereinbefore set forth and also to provide novel polymers produced therewith.

A still further object of this invention is to provide novel compositions of matter in which one or a combination of two or more of the novel monomers, polymers and/or reaction products are components thereof.

A still further object of this invention is to provide methods for producing the novel monomers of this invention.

A still further object of this invention is to provide methods for producing the polymers of this invention.

A still further object of this invention is to provide methods for reacting said novel monomers and polymers with other reactants to provide novel reaction products.

The foregoing as well as other objects of this invention will at least in part be apparent from the following description.

The following Examples 1–16 are given by way of illustration and not limitation and serve merely to illustrate various specific methods for producing examples of monomers of this invention.

EXAMPLE 1.—N-VINYL-CARBOXYMETHYL-2-PYRROLIDONE (a) *Preparation of 5-carboxymethyl-2-pyrrolidone*

The ester was prepared from 375 grams of pyroglutamic acid by adding thereto 3750 grams of anhydrous methanol and 37.5 grams of $BF_3$–Ether complex with stirring at 25° C. Stirring at 25° C. was continued for 16 hours. Then the resultant mass was neutralized with 400 grams of a weakly basic ion exchange resin, and filtered to remove the resin. Then the methanol was removed in vacuo therefrom and 348.6 grams of the ester was recovered by distillation at 131°–133° C. at 0.8 mm. of mercury pressure, and had an index of refraction at 25° C. of 1.4847.

(b) *Preparation of N-vinyl-5-carboxymethyl-2-pyrrolidone*

About 143 grams (1.0 mole) of said ester, 144 grams (2.0 moles) of ethyl vinyl ether, 14.4 grams (0.045 mole) of mercuric acetate, 2.8 grams of 2,2′-methylene bis (4-methyl-6-tertiary butyl phenol), and 220 mls. of dry pure dioxane were charged into a 1 liter rocking autoclave, blanketed with nitrogen and heated to 150° C. and maintained at that temperature for 16 hours. Then the mass in the autoclave was cooled to room temperature after which the dioxane and excess ether were stripped off by distillation and then the mass was subjected to vacuum distillation at 101° C. under 0.08 mm. of mercury pressure and a distillate was isolated and recovered. It was a crude monomeric N-vinyl-5-carboxymethyl-2-pyrrolidone product, measuring 55 grams (32.5% conversion) and had an index of refraction at 25° C. of 1.4960. The yield was 70% based upon unrecovered methyl pyroglutamate.

*Analysis.*—Calculated: C, 56.80; H, 6.51; N, 8.29. Found: C, 56.82; H, 6.39; N, 8.39.

(c1) *Purification*

To the entire 55 grams of the crude monomeric product was added 4.4 grams of finely divided sodium methylate at 25° C. The mixture was stirred for several hours and then 50 ml. of benzene were added thereto whereupon salts of unreacted compound were thrown out and were removed therefrom by centrifugation. The benzene solvent was vacuum stripped and the residue was distilled in vacuo whereby there was obtained a 59% yield of purified monomeric N-vinyl methyl pyroglutamate, known as Product 1a.

A comparison of the vapor phase chromatography charts indicated the areas of the peaks in the order of their appearance.

*Area percent*

| Crude | Purified |
|---|---|
| 0.5 | 2.7 |
| 94.0 | 97.0 |
| 5.5 | 0.0 |

The higher boiling unreacted methyl pyroglutamate went from 5.5% concentration to zero. The lower boiling fraction went from 0.5 to 2.7%. The purified monomer upon redistillation through a fractionating column was easily separated from the lower boiling impurity. The lower boiling impurity boiled at 40° C. at 0.02 mm. Analyses proved this to be N-vinyl pyrrolidone obtained by decarboxylation of N-vinyl methyl pyroglutamate in the presence of the N-sodium salt. Pure N-vinyl methyl pyroglutamate was obtained at 76°–78° C./0.02 mm. pressure and is known as Product 1a.

(c2) An alternate method which was employed to purify said crude monomeric product was by vacuum distillation through a packed fractionating column. This was achieved by first treating the monomeric product in water or water-alcohol solution to the action of activated carbon, such as "Nuchar C–100 N" to remove most of the amber color present in the crude monomer. Then the so treated monomer was subjected to vacuum distillation in a 20 plate column whereby there was obtained in one distillation said monomer in the form of a pure colorless material. Vapor phase chromatography of product indicated single peak, 99.9% pure, monomer was obtained in the middle cuts and this is known as Product 1b.

(d) *Effect of anti-oxidant on yields of N-vinyl methyl pyroglutamate*

| | Grams |
|---|---|
| Methyl pyroglutamate | 114.4 |
| Ethyl vinyl ether | 230.4 |
| Mercuric acetate | 11.2 |
| Dioxane | 200.0 |

The above components were charged into a 1 liter rocking autoclave, blanketed with nitrogen, heated to and maintained at 150° C. for 16 hours, then cooled to room temperature. Then the dioxane and excess ether were distilled off and subsequently 0.2 gram of t-butyl catechol was added to and uniformly distributed throughout the crude reaction residue. The resultant mass was then subjected to vacuum distillation and a fraction thereof was isolated and recovered by distillation thereof at 101° C. under 0.08 mm. of mercury pressure. This fraction was monomeric N-vinyl methyl pyroglutamate, weighing 24.6 grams (18% conversion) and represented a yield of 51.5% based upon unrecovered methyl pyroglutamate.

EXAMPLE 2.—N-VINYL-5-CARBOXYBUTYL-2-PYRROLIDONE (a) *Preparation of butyl pyroglutamate*

| | Grams | Ml. |
|---|---|---|
| Pyroglutamic acid | 258 | |
| n-Butanol | | 1,290 |
| Benzene | | 1,290 |
| Conc. Sulfuric Acid | | 12.9 |

The above components were added in that order to a 3-neck flask equipped with a Dean-Stark water trap, reflux condenser, stirrer, and thermometer. The mix was maintained for 2 hours at 83°–85° C. whereby the benzene plus water was refluxed at 83°–85° C. over that period. Thirty-six ml. of water was collected indicating a complete reaction. The reaction mass was cooled to room temperature and the acid was neutralized by addition of a weakly basic ion exchange resin (I.R. 45) and the resin was filtered off. The excess butanol was removed by vacuum distillation, and pure butyl pyroglutamate was isolated and collected at 158°–160° C. at 0.4 mm. pressure, weighed 273 grams (74% yield) and had an index of refraction of 1.4704 at 25° C.

(b) N-vinyl-5-carboxybutyl-2-pyrrolidone (N-vinyl butyl pyroglutamate)

About 258 grams (1.4 moles) of 5-carboxybutyl-2-pyrrolidone, 200 grams (2.8 moles) of ethyl vinyl ether, 20 grams (0.063 moles) of mercuric acetate, 2.0 grams 2,2′-methylene bis (4-methyl-6-tertiary butyl phenol), and 300 milliliters of dry dioxane were placed in a one liter rocking autoclave, blanketed with nitrogen, and heated at 150° C. for 16 hours. Then the mass was cooled to room temperature and subsequently subjected to vacuum distillation whereby there was isolated and recovered a fraction boiling at 105° C. under 0.07 mm. of mercury pressure, weighing 92 grams, known as Product 2, being monomeric N-vinyl-5-carboxybutyl-2-pyrrolidone and having an index of refraction at 25° C. of 1.4820.

*Analysis.*—Calculated: C, 62.55; H, 8.05; N, 6.64. Found: C, 62.53; H, 7.92; N, 6.40.

EXAMPLE 3.—N-VINYL-5-CARBOXYOCTYL-2-PYRROLIDONE

(a) Preparation of 5-carboxyoctyl-2-pyrrolidone

One hundred twenty nine grams (1.0 mole) of pyroglutamic acid, and 520 grams (4 moles) of octyl alcohol were dissolved in 285 milliliters of benzene. Then 1.5 grams of p-toluene sulfonic acid were added to the solution. The mixture was heated to reflux and the water of reaction was removed in a Dean and Stark trap. When the reaction was completed, the catalyst was neutralized with "I.R. 45" ion exchange resin. Benzene and unreacted octyl alcohol were removed under vacuum and the residue distilled. The fraction boiling at 179°–180° C. at 0.1 mm. of mercury pressure was isolated and recovered, weighed 123 grams (51% of theoretical), known as Product 3, being N-vinyl-5-carboxyoctyl-2-pyrrolidone and having an index of refraction at 25° C. of 1.4675.

*Analysis.*—Calculated for $C_{13}H_{23}NO_3$: C, 64.65; H, 9.55; N, 5.81. Found: C, 64.77; H, 9.43; N, 5.53.

(b) Preparation of N-vinyl-5-carboxyoctyl-2-pyrrolidone

Seventy-two and three tenths grams (0.3 mole) of 5-carboxyoctyl-2-pyrrolidone, 144 grams (5.0 moles) of ethyl vinyl ether, 7 grams (0.02 mole) of mercuric acetate, 0.5 grams of 2,2′-methylene bis (4-methyl-6-tertiary butyl phenol), and 100 milliliters of dioxane were placed in a 300 milliliter rocking autoclave and heated at 150° C. for 16 hours under an atmosphere of nitrogen. The contents of the autoclave were cooled to room temperature, filtered, and distilled under vacuum. A fraction boiling at 164°–166° C. under 0.4 mm. of mercury pressure was isolated and recovered, weighed 31.4 grams (38.8% of theory), known as Product 3, being monomeric N-vinyl-5-carboxyoctyl-2-pyrrolidone, and having an index of refraction at 25° C. of 1.4727.

EXAMPLE 4.—N-VINYL-5-CARBOXYOCTADECYL-2-PYRROLIDONE

(a) Preparation of 5-carboxyoctadecyl-2-pyrrolidone

|  | Grams | Moles | Ml. |
|---|---|---|---|
| Pyroglutamic Acid | 129 | 1.0 |  |
| n-Octadecyl Alcohol | 405 | 1.5 |  |
| Benzene |  |  | 750 |
| p-Toluenesulfonic Acid | 10 |  |  |

The above compounds were added to a three-neck flask equipped as in Example 2, and then refluxed for three hours, during which 18 ml. (1 mole) of water was collected in the water trap. The solution was maintained at 83°–85° C. for an additional 0.5 hour and some benzene removed at the same time. Upon cooling to 25° C. and standing overnight, 406 grams of crude solid was collected by filtration followed by a hexane wash at 25° C. The crude solid melted at 62.5°–69° C. The crude product was dissolved in 16 liters of hot hexane, allowed to cool slowly to room temperature, and then filtered, washed with dry hexane at 25° C. whereby there was obtained 244 grams (68%) of white crystals, being 5-carboxyoctadecyl-2-pyrrolidone, and melting at 72°–73.5° C.

*Analysis.*—Calculated: C, 72.39; H, 11.35. Found: C, 72.35; H, 11.12.

(b) Preparation of N-vinyl-5-carboxyoctadecyl-2-pyrrolidone

About 50 grams (0.157 mole) of 5-carboxy octadecyl-2-pyrrolidone, 140 grams (2.0 moles) of ethyl vinyl ether, 5 grams (0.016 mole) of mercuric acetate, 0.5 grams of 2,2′-methylene bis (4-methyl-6-tertiary butyl phenol), and 85 milliliters of dry dioxane were reacted as in "b" of Example 1. The reaction mixture was freed of excess ethyl vinyl ether and dioxane by vacuum distillation and a solid residue was obtained. The residue was subjected to recrystallization from hexane whereby there was obtained 13.9 grams of pure monomeric N-vinyl-5-carboxyoctadecyl-2-pyrrolidone in the form of crystals, known as Product 4, and melting at 60.5°–61.5° C.

*Analysis.*—Calculated for $C_{25}H_{45}NO_3$: C, 73.60; H, 11.11; N, 3.44. Found: C, 73.60; H, 11.19; N, 3.45.

EXAMPLE 5.—N-VINYL-5-SODIUMCARBOXY-2-PYRROLIDONE

(N-vinyl-sodium pyrogultamate)

Twenty-four grams (0.14 mole) of N-vinyl-5-carboxymethyl-2-pyrrolidone (Product 1), 6 grams (0.15 mole) of sodium hydroxide, 20 mls. of water and 100 mls. of ethanol were refluxed for 4 hours thereby to convert Product 1 into its sodium salt. The mass was cooled to room temperature and then there was added thereto 300 mls. of acetone causing the sodium salt to throw out of solution. The salt was separated and recovered by filtration, washed with acetone and dried under vacuum. The dried product was N-vinyl-sodium pyroglutamate.

*Analysis.*—Calculated for $C_7H_8NO_3Na$: N, 7.92. Found: N, 7.99

EXAMPLE 6.—PREPARATION OF N-VINYL-5-CARBOXY-2-PYRROLIDONE

(N-vinyl pyroglutamic acid)

Fifty grams (0.3 mole) of N-vinyl-5-carboxymethyl-2-pyrrolidone, together with 175 milliliters of 14.3% ethanolic potassium hydroxide was refluxed for 6 hours. After cooling, the mixture was acidified with concentrated hydrochloric acid and filtered to remove potassium chloride by-product. The crude N-vinyl pyroglutamic acid was isolated by removing the solvent under vacuum. Recrystallization from isopropyl alcohol gave 12.4 grams (27% yield) of monomeric N-vinyl pyroglutamic acid, known as Product 6, and having a melting point of 187°–189° C. Infra red and elemental analysis was consistent with N-vinyl-5-carboxy-2-pyrrolidone.

EXAMPLE 7.—PREPARATION OF N-VINYL AMMONIUM PYROGLUTAMATE

Anhydrous ammonia was added to a solution of 3.38 grams (0.02 mole) of N-vinyl pyroglutamic acid (Product 6) in 15 milliliters of ethanol until the solution was basic. Then diethyl ether was added thereto whereby said ammonium salt precipitated out. The mass was filtered to separate out the salt which was washed with diethyl ether and then dried. The dried N-vinyl ammonium pyroglutamate weighed 3.1 grams (90% of theoretical), was a white solid, known as Product 7 and melting at 148°–151° C.

EXAMPLE 8.—PREPARATION OF N-VINYL MORPHOLINE PYROGLUTAMATE

Two and two-tenths grams (0.026 mole) of morpholine was added to a solution of 3.38 grams (0.02 mole) of N-vinyl pyroglutamic acid (Product 6) in 15 milliliters of ethanol. Then diethyl ether was added to said mass whereby an oily material precipitated out and crystallized upon standing. The crystalline material was separated and recovered by filtration, washed with diethyl ether and dried. The dry N-vinyl morpholinium pyroglutamate, known as Product 8, was a white solid crystalline material, melting at 254.6° C.

EXAMPLE 9.—PREPARATION OF N-VINYL PYROGLUTAMIC ACID HYDRAZIDE

To a solution of 15.9 grams (0.094 mole) of N-vinyl methyl pyroglutamate (Product 1) in 50 milliliters of ethanol was added 15.0 grams (0.47 mole) of 95% hydrazine. The mixture was allowed to stand for 24 hours at room temperature. Fifty milliliters of ether was added thereto whereby the novel hydrazide precipitated out. It was recovered to filtration, washed with ether and dried. The dried hydrazide weighed 5.1 grams, known as Product 9 and had a melting point of 148.5°–149.5° C.

Analysis for $C_7H_{11}N_3O_2$.—Calculated: C, 49.60; H, 6.54; N, 24.85. Found: C, 49.81; H, 6.56; N, 24.47.

EXAMPLE 10.—PREPARATION OF N-VINYL PYROGLUTAMIDE

To a solution of 4 grams (0.235 mole) of anhydrous ammonia in 50 mls. of butanol was added 16.9 grams (0.1 mole) of N-vinyl methyl pyroglutamate. The mass was permitted to stand overnight at room temperature. Then the solvent was removed by vacuum distillation whereupon there was recovered a crude product. This was recrystallized from benzene whereby there was obtained a white solid, melting at 192°–195° C., known as Product 10, and being N-vinyl pyroglutamide.

Analysis thereof based on $C_7H_{10}N_2O_2$.—Calculated: C, 54.55; H, 6.50. Found: C, 54.31; H, 6.64.

EXAMPLE 11.—PREPARATION OF N-VINYL ALLYL PYROGLUTAMATE

One hundred and twenty-nine grams (1.0 mole) of pyroglutamic acid, 290 grams (5.0 moles) of allyl alcohol and 800 mls. of toluene were charged into a glass reactor. While said mixture was being stirred there was added slowly thereto 0.98 grams (0.01 mole) of concentrated sulfuric acid. Stirring was continued and the mass was heated to reflux and so maintained until 18 mls. of water of reaction was produced and collected. The mass was neutralized by the addition of a weak amine ion exchange resin ("IR 45"), then filtered and the toluene was evaporated off leaving behind a white solid which was recrystallized from 1350 mls. of benzene-hexane 1:1 (V), whereby there was obtained 98.0 grams (58% yield) of white solid product, which was pure allyl pyroglutamate, melting at 97.5°–98.5° C.

Analysis.—Calculated for $C_8H_{11}NO_3$: C, 56.80; H, 6.51; N, 8.29. Found: C, 56.75; H, 6.56; N, 8.59.

Eighty four and one-half grams (0.5 mole) of allyl pyroglutamate, 72 grams (1 mole) of ethyl vinyl ether, 7.2 grams (0.022 mole) of mercuric acetate, 1.4 grams of 2,2′ methylene bis (4-methyl-6-t-butyl phenol) and 110 mls. of dry hexane were charged into a 1 liter rocking autoclave, blanketed with nitrogen and then sealed. The mixture therein was heated to and maintained at 150° C. for 16 hours. The reaction mass was then cooled to room temperature and 29.4 grams (30% yield) of N-vinyl allyl pyroglutamate was isolated and recovered by distillation under vacuum at 0.08 mm. of mercury pressure, and is known as Product 11.

EXAMPLE 12.—PREPARATION OF N-VINYL PYROGLUTAMIC ACID DIMETHYL AMIDE

Four and one-half grams (0.1 mole) of dimethyl amine, 50 grams of butanol and 5.07 grams (0.03 mole) of N-vinyl methyl pyroglutamate (Product 1a) were charged into an autoclave under a blanket of nitrogen. The mass therein was heated to and maintained at 70° C. for 10 hours, then cooled to 25° C. The butanol and excess amine were distilled off and unreacted glutamate was removed by ether extraction leaving behind an oily residue, which was subjected to heat under low pressure to remove last traces of butanol and ether leaving behind a glassy solid (40% yield) which slowly crystallized. The crystalline material was found to be a D–L mixture of N-vinyl pyroglutamic acid dimethyl amide which showed no optical rotation on a polarimeter.

EXAMPLE 13.—PREPARATION OF N-ALLYL METHYL PYROGLUTAMATE

Eight and one-half grams (0.6 mole) of methyl pyroglutamate in 20 milliliters of methanol and 3.24 grams (0.6 mole) of sodium methylate in 25 milliliters of methanol were mixed together whereby reaction occurred to produce a solution consisting essentially of N-sodium methyl pyroglutamate in methanol. Thirty-five milliliters of dimethyl formamide was added to said solution and the mass was heated to a pot temperature of 100° C. to strip off the methanol after which the mass, consisting essentially of the N-sodium methyl pyroglutamate in dimethyl formamide, was permitted to cool to about 40° C. and while initially at said temperature there was slowly added thereto 66 grams (1.0 mole) of allyl chloride. The temperature of the mass during said addition was controlled by external cooling to maintain it at about 45° C. After the last increment of the allyl chloride was added and the exothermic reaction produced thereby appeared to subside as evidenced by a lowering of the temperature of the mass to about 40° C., external heat was applied thereto and the temperature of the mass was maintained at 40° C. for 3 hours. At the end of this period, the mass was filtered to separate the NaCl by-product of reaction therefrom and the filtrate was recovered. The filtrate was heated while under a high vacuum to strip off the dimethyl formamide and then was subjected to vacuum distillation whereby there was obtained N-allyl methyl pyroglutamate, known as Product 13, in 60% of theoretical yield, having a boiling point of 98°–99° C. at 0.1 mm. of mercury pressure and having an index of refraction at 22° C. of 1.4814.

Analysis for $C_9H_{13}NO$.—Calculated: C, 59.00; H, 7.10; N, 7.15. Found: C, 59.24; H, 6.98; N, 7.25.

EXAMPLE 14.—PREPARATION OF N-ALLYL PYROGLUTAMIC ACID

Eighteen and three-tenths grams (0.1 mole) of N-allyl methyl pyroglutamate (Product 13), 4.4 grams (0.11 mole) of sodium hydroxide in 100 grams of water were mixed together and the mixture was heated to and maintained at 90° C. for two and one-half hours to convert said pyroglutamate to its sodium salt. The reaction mass was cooled to room temperature and then acidified with 11 grams (0.11 mole) of concentrated HCl thereby to convert the sodium salt to N-allyl pyroglutamic acid, with the production of NaCl reaction by-product. The resultant mass was heated under vacuum to evaporate off the water. Then the residue was charged into acetone which selectively dissolved the N-allyl pyroglutamic acid. The mass was filtered to separate the NaCl reaction by product therefrom and the filtrate was collected. The filtrate was heated to strip off the acetone leaving behind a residue which was crude N-allyl pyroglutamic acid in the solid state. The crude residue was recrystallized from 100 milliliters of benzene and dried whereby there was obtained 14.2 grams (84% yield) of N-allyl pyroglutamic acid, known as Product 14, being in the solid state and having a melting point of 93°–94.6° C.

Analysis for $C_8H_{11}NO_3$.—Calculated: C, 56.80; H, 6.51; N, 8.29: Found: C, 56.67; H, 6.33; N, 7.95.

EXAMPLE 15.—PREPARATION OF N-ALLYL (ALLYL PYROGLUTAMATE)

Fourteen grams (0.08 mole) of N-allyl pyroglutamic acid (Product 14), 87 grams (1.5 moles) of allyl alcohol, 0.098 grams (0.001 mole) of concentrated sulfuric acid and 175 milliliters of benzene were refluxed and water of reaction was removed by azeotropic distillation until about 1.5 grams of water of reaction was removed. Then the mass was subjected to heat under vacuum whereby the benzene and excess allyl alcohol were stripped off leaving behind a crude product which was distilled under vacuum and the fraction boiling at 108°–109° C. under 0.05 mm. of mercury pressure was collected. It was N-allyl (allyl pyroglutamate), known as Product 15, yield 67% of theoretical, and had an index of refraction at 25° C. of 1.4850.

Analysis.—Calculated for $C_{11}H_{15}NO_3$: C, 63.10; H, 7.18; N, 6.70. Found: C, 63.31; H, 7.45; N, 6.84.

EXAMPLE 16.—PREPARATION OF 1,1'-METHYLENE BIS-(ALLYL PYROGLUTAMATE)

A mixture consisting of 5.48 grams (0.02 mole) of 1,1'-methylene bis-pyroglutamic acid, 46.4 grams (0.8 mole) of allyl alcohol, .588 gram (.006 mole) of concentrated $H_2SO_4$ and 100 milliliters of benzene was refluxed and the water of reaction collected by azeotropic distillation. When the reaction was completed, as evidenced by approximately .76 gram (.04 mole) of water of reaction collected, the resultant solution was made neutral with a basic ion exchange resin "IR 45." Then the benzene and excess alcohol were removed therefrom under vacuum thereby to leave behind a crude solid product. The crude product was recrystallized from 60 grams of benzene-petroleum ether (3:1 volume) whereby there was obtained said 1,1'-methylene bis-(allyl pyroglutamate), known as Product 16, in yield of 47% of theoretical, having a melting point of 58–60° C., and being polymerizable without further purification.

The polymers of this invention are (1) homopolymers of any of the individual monomers of Formulas IA–IVA, (2) copolymers of at least two, that is two or more of the individual monomers of Formulas IA–IVA and (3) copolymers of (a) at least one, that is one or more of the individual monomers of Formulas IA–IVA and (b) at last one, that is one or more individual monomers other than those of Formulas IA–IVA, having a

group and being copolymerizable therewith, with the quantity of (a) in said copolymers being at least 1% by weight thereof.

Polymerization for the production of the homopolymers and copolymers of this invention is effected in the presence of a catalyst.

Among some of the catalysts which may be used to effect polymerization are hydrogen peroxide, hydrogen peroxide plus ammonia, potassium persulfate, potassium persulfate plus sodium sulfate, and boron trifluoride in catalytic and also molar plus catalytic amounts. Other catalysts which may be used are organic peroxygen compounds such as benzoyl peroxide, t-butyl peroxide, t-butyl peroxide plus aromatic tertiary amines, methyl ethyl ketone peroxide, isopropyl percarbonate, cumene hydroperoxide, 2,5-dimethylhexane 2,5-di(peroxy benzoate), and 2,5-dimethyl hexane 2,5-di hydroperoxide. One of the preferred catalysts is a,a' - azobisisobutyronitrile "ABIN." Other catalytic agents may be used such as the high energy rays. These may include actinic, ultra violet, X-ray, and gamma radiations. Radiation from high energy electron beam accelerators, linear accelerators, or resonant transformers may also be used.

The polymerizations can be carried out in solvents, in bulk, as emulsions, and as suspensions. Benzene, xylene, ethanol, and water have been used as solvents for the polymerization. We prefer the bulk polymerization method for the liquid monomers.

The following catalysts were used at various temperatures to effect polymerization of the N-vinyl hydrocarbyl pyroglutamate monomers:

```
                                                          ° C.
("ABIN") a,a'-azobis isobutyronitrile _____   40–120
t-Butyl peroxide _____  100–140
2,5-dimethyl hexane 2,5-di (peroxybenzoate) __   95–100
2,5-dimethyl hexane 2,5-di hydroperoxide ____   95–120
Cumene hydroperoxide _____      140
```

The following table illustrates some of the polymerization runs made on N-vinyl methyl pyroglutamate to produce certain poly-N-vinyl methyl pyroglutamate homopolymers.

| Catalyst | Percent | Reaction Conditions | Percent Yield | Red. Visc. |
|---|---|---|---|---|
| "ABIN" | 0.5 | 12 days at 40° C. then 2 days at 70° C. | 75.0 | 0.348 |
| t-Butyl peroxide | 2.0 | 18 hrs. at 120° C | 40.0 | 0.183 |
| Methylethyl ketone peroxide | 2.0 | 18 hrs. at 140° C | 40.0 | 0.162 |
| 2,5,-dimethyl hexane 2,5,-di (peroxybenzoate). | 1.0 | 19 hrs. at 95° C | 70.4 | 0.128 |
| Cumene hydroperoxide | 2.5 | 22 hrs. at 140° C | 66.7 | 0.03 |
| 2,5-dimethyl hexane 2,5-dihydroperoxide. | 1.0 | 19 hrs. at 95° C | 60.0 | 0.070 |

"Red. Visc." is the reduced viscosity at 25° C. of a 0.5% solution of polymer in methanol.

The following Examples P–1 to P–40 are examples of some other polymers of this invention and methods for producing them, all of them being given by way of illustration and not limitation.

EXAMPLE P–1.—POLYMERIZATION OF N-VINYL-5-CARBOXYMETHYL-2-PYRROLIDONE WITH t-BUTYL PEROXIDE

One hundred grams of N-vinyl-5-carboxymethyl-2-pyrrolidone (Product 1a) and 2 grams of t-butyl peroxide were charged into a glass reactor. Nitrogen was bubbled through the mixture to sweep out the air in the mixture and reactor and to provide a nitrogen blanket therein whereupon the reactor was sealed. Then the mixture in the sealed reactor was heated to and maintained at 120° C. for 18 hours in the course of which polymerization of Product 1a occurred, as evidenced by the mixture having become a thick viscous liquid. Then the viscous liquid was dissolved in 10 liters of acetone. This solution was poured into 10 liters of diethyl ether whereupon the homopolymer of Product 1a precipitated out of solution. The mass was filtered to separate out and recover the precipitate which was washed with diethyl ether and dried. The dried precipitate was poly-N-vinyl methyl pyroglutamate in the form of a solid product, known as Product P–1, a 0.5% solution of which in methanol had a reduced viscosity of 0.164 at 25° C.

EXAMPLE P–2.—POLYMERIZATION OF PRODUCT 1a WITH "ABIN" CATALYST

One hundred grams of Product 1a, 0.5 grams of "ABIN" catalyst were charged into a glass reactor, purged with nitrogen and sealed. The mix was heated to and maintained at 40° C. for 10 days whereupon polymerization of Product 1a was effected. Then the reaction mass was treated with acetone and diethyl ether as in Example 1 whereby there was isolated and recovered poly-N-vinyl methyl pyroglutamate in the form of a clear solid, known as Product P–2, a 0.5% solution of which in methanol had a reduced viscosity of 0.32 at 25° C.

EXAMPLE P–3.—POLYMERIZATION OF N-VINYL-5-CARBOXYBUTYL-2-PYRROLIDONE

One hundred grams of N-vinyl-5-carboxybutyl-2-pyrrolidone (Product 2) and 0.5 grams of "ABIN" catalyst were charged into a glass reactor, purged with nitrogen and the reactor was then sealed. The mix was heated and maintained at 40° C. for 5 days and then to and maintained at 70° C. for 2 days whereby polymerization was effected. The mass was then dissolved in a volume of acetone measuring 3.3 times that of said mass. This solution was poured into 15 liters of water for precipitating the polymer, which was then isolated and recovered by filtration followed by a water wash and dried. The dry product was poly-N-vinyl butyl pyroglutamate, known as Product P–3, a 0.5% solution of which in methanol had a reduced viscosity of 0.12 at 25° C.

EXAMPLE P–4.—POLYMERIZATION OF N-VINYL-5-CARBOXYOCTYL-2-PYRROLIDONE

One gram of N-vinyl-5-carboxyoctyl-2-pyrollidone (Product 3) and 0.01 gram of t-butyl peroxide were combined under nitrogen in a reaction vessel. While under nitrogen the mixture of components were heated to and maintained at 120° C. for 24 hours, then the temperature thereof was increased to and maintained at 140° C. for 24 hours after which the resultant mass was permitted to cool to room temperature. The resultant reaction product was poly-N-vinyl-5-carboxyoctyl-2-pyrrolidone, in the form of a viscous liquid, known as Product P–4. A 0.5% solution of the polymer in methanol had a reduced viscosity of 0.015 at 25° C.

EXAMPLE P–5.—POLYMERIZATION OF N-VINYL-5-CARBOXYOCTADECYL-2-PYRROLIDONE

Two grams of N-vinyl-5-carboxyoctadecyl-2-pyrrolidone (Product 4) were dissolved in 5 milliliters of dry benzene, and 0.02 gram of "ABIN" was added thereto. While under nitrogen, the mass was refluxed for 40 hours. Then an additional 0.02 gram of "ABIN" and 0.02 gram of t-butyl peroxide were added thereto and the benzene was distilled off and the temperature of the mass was raised to 130° C. The mass was maintained at 130° C. for 3 days and then permitted to cool to room temperature. It was poly-N-vinyl-5-carboxyoctadecyl-2-pyrrolidone, known as Product P–5, 0.5% solution of which in methanol had a reduced viscosity of 0.04 at 25° C. The average molecular weight of said polymer was 893.

EXAMPLE P–6.—COPOLYMERIZATION OF N-VINYL-CARBOXYOCTYL-2-PYRROLIDONE AND METHYL METHACRYLATE

Three grams of N-vinyl-carboxyoctyl-2-pyrrolidone (Product 3), 3 grams of methyl methacrylate and 0.03 gram of "ABIN" were heated to and maintained at 40° C. under a nitrogen blanket for 16 hours and then at 70° C. for 96 hours. The resultant mass was cooled to room temperature at which temperature it was solid. The solid mass was dissolved in 10 milliliters of methylene chloride. Then the copolymer was precipitated out of said solution by the addition of 150 milliliters of hexane thereto. Then the copolymer precipitate was separated therefrom and recovered by filtration after which it was washed with hexane and dried at 70° C. while under a pressure of 0.2 mm. of mercury for 2 hours. The dry product, known as Product P–6, was a copolymer of said monomers, weighed 2.7 grams (45% yield), a 0.5% solution of which in dimethyl formamide had a reduced viscosity of 0.336 at 25° C. The percent nitrogen content of said copolymer was found to be 1.13 indicating 25% by weight of N-vinyl octyl pyroglutamate in said copolymer.

EXAMPLES P–7 TO P–15.—COPOLYMERS OF N-VINYL METHYL PYROGLUTAMATE (N-VMPG) AND N-VINYL BUTYL PYROGLUTAMATE (N-VBPG)

Into individual polymerization tubes, N-vinyl methyl pyroglutamate (Product 1a) and comonomer, N-vinyl butyl pyroglutamate (Product 2), the sum of whose weights was 100 grams and in the proportions shown in the following table, were charged and mixed together under a blanket of nitrogen in the proportions shown in the following table, with the sum of the weights of Product 1a and comonomer being 100 grams in each case. Then 0.5 parts by weight of "ABIN" was added to the mass in each tube. While being maintained under the nitrogen blanket, the masses in said tubes were heated to and maintained at 50° C. for 120 hours after which the temperature thereof was raised to and maintained at 70° C. for 48 hours. Then each mass was poured into and dissolved in 3300 grams of acetone. Each solution was poured into 15 liters of a "Precipitation Solvent," either water or diethyl ether to precipitate out the copolymers, known as Products P–7 to P–15, which were then recovered by filtration, washed with the precipitation solvent and dried. All of the copolymers, Products P–7 to P–15 obtained were solid, were water-insoluble but were soluble in acetone and in methanol. The percent of each monomer in the copolymers was calculated from the C, H and N analyses thereof and the reduced viscosities of the 0.5% solutions thereof in methanol at 25° C. were ascertained and the latter appear in said table under the heading "Reduced Viscosity."

| Products No. | Wt. Percent N-VBPG In Feed | Wt. Percent N-VBPG In Copolymer | Precipitation Solvent | Copolymer percent Yield | Reduced Viscosity |
|---|---|---|---|---|---|
| 7 | 90 | | Water | 63.5 | 0.128 |
| 8 | 80 | | do | 57.0 | 0.143 |
| 9 | 70 | | do | 57.0 | 0.153 |
| 10 | 50 | | do | 57.0 | 0.177 |
| 11 | 60 | 50.5 | do | 57.0 | 0.161 |
| 12 | 40 | 36.1 | Diethyl Ether | 57.0 | 0.188 |
| 13 | 30 | 22.7 | do | 60.0 | 0.193 |
| 14 | 20 | 6.2 | do | 63.5 | 0.186 |
| 15 | 10 | 6.2 | do | 63.5 | 0.197 |

All of the copolymers were water-insoluble but were soluble in acetone and methanol.

EXAMPLES P–16 TO P–26.—COPOLYMERS OF N-VINYL METHYL PYROGLUTAMATE AND OTHER MONOMERS

Into individual polymerization tubes were charged and mixed together under a nitrogen blanket, N-vinyl pyroglutamate (Products 1a) and the respective comonomers in the proportions shown in the following table, with the sum of the weights of (Product 1a) and the comonomer in each case being 100 grams. Then there was added to the mass in each tube 0.5 parts of "ABIN" catalyst. Each tube was then stoppered and the mass, under nitrogen, therein was heated to and maintained at 40° C. for 16 hours and then the temperature thereof was raised to and maintained at 70° C. for 48 hours and finally the mass was cooled to room temperature. The resultant masses in said tubes contained good yields of copolymers of N-vinyl methyl pyroglutamate and the respective comonomers employed. Said copolymers were solid products at 25° C. and were separated and recovered from said resultant masses. This was achieved by first dissolving the masses in 3300 grams of the particular "Polymer Solvent" and precipitating the copolymer out of solution by pouring the individual solutions into 15 liters of the particular "Precipitating non-Solvent" specified in the following table; after which the resultant masses were filtered and the recovered precipitate was washed with its "Precipitating non-Solvent" and dried under vacuum. The percent nitrogen of the copolymers, known as Products P–16 to P–26 were ascertained by analysis and the percent by weight of comonomers in the respective copolymers was determined. The reduced viscosities of solutions of 0.5% of P–16 to P–19, P–21 and P–22 respectively in methanol and P–20, P–23 to P–26 respectively in dimethyl formamide were determined and appear in the following table under the heading, "Red. Visc."

sodium carbonate dissolved in 300 milliliters of water were heated together for 2 hours at 90° C. The reaction mixture was acidified to pH 4 with concentrated hydrochloric acid, whereupon the polymeric partially hydrolyzed polymer precipitated from solution. It was filter-separated from the water and washed several times with acetone/water (75/25 by vol.), then with acetone and finally dried under vacuum. The dry product, known as Product P–28, had a neutralization equivalent of 280 indicating 55.5% hydrolysis of the methyl ester. Yield of polymer was 39.8 grams (92.3% of theory).

(B) Using one mole of polyvinyl methyl pyroglutamate and 0.8 mole of sodium carbonate and otherwise repeating "A" above, the resulting polymeric carboxylic acid obtained and known as Product P–29, had a neutralization equivalent of 202. This indicated 77% hydrolysis of the methyl ester. Yield was 31.3 grams (93.5% of theory).

(C) A solution of 54.8 grams (0.324 mole) of polyvinyl-5-carboxymethyl-2-pyrrolidone, 32.4 grams (0.81 mole) of sodium hydroxide in 300 milliliters of water was heated for 16 hours at 90° C. The reaction mass was neutralized with dilute hydrochloric acid which precipitated the polymeric acid which was washed with water and then acetone and finally dried. The dry product, known as Product P–30, weighed 48.4 grams (97% of theory). Its neutralization equivalent was 181 indicating approximately 88% hydrolysis of the methyl ester.

EXAMPLE P–31.—HYDROLYSIS OF (N-VINYL-5-CARBOXYMETHYL-2-PYRROLIDONE) AND (N-VINYL-5-CARBOXYBUTYL-2-PYRROLIDONE) COPOLYMER

A copolymer containing equal weights of the N-vinyl pyrrolidone esters and having a molecular weight of ap-

| Product | Comonomer | Wt. percent Comonomer Charged | Polymer Solvent | Precipitating non-Solvent | Wt. percent Comonomer in Polymer | Percent Nitrogen | Red. Visc. |
|---|---|---|---|---|---|---|---|
| P–16 | N-vinyl pyrrolidone | 30 | Acetone | Ether | 54 | 10.64 | 0.43 |
| P–17 | ----do---- | 50 | Methanol | ----do---- | 72 | 11.49 | 0.66 |
| P–18 | ----do---- | 70 | ----do---- | ----do---- | ---- | 10.42 | 1.35 |
| P–19 | ----do---- | 78 | (1) | ---- | 78 | ---- | 1.38 |
| P–20 | Acrylonitrile | 50 | DMF | Water | 55 | 13.44 | 9.50 |
| P–21 | Vinyl acetate | 70 | Acetone | Ether | 46 | 6.13 | 0.16 |
| P–22 | ----do---- | 50 | ----do---- | ----do---- | 34 | 7.00 | 0.17 |
| P–23 | Maleic anhydride | 20 | ----do---- | ----do---- | 43 | 5.95 | 0.21 |
| P–24 | Methyl methacrylate | 70 | MeCl₂ | ----do---- | 88 | 1.81 | 3.62 |
| P–25 | ----do---- | 50 | MeCl₂ | ----do---- | 59 | 3.40 | 2.49 |
| P–26 | ----do---- | 20 | MeCl₂ | ----do---- | 21 | 6.55 | 0.73 |

¹ Not precipitated; "DMF" is dimethyl formamide.

EXAMPLE P–27.—PREPARATION OF POLY VINYL-5-SODIUM CARBOXYLATE-2-PYRROLIDONE

A solution consisting of 54.8 grams (0.324 mole) of poly vinyl-5-carboxymethyl-2-pyrrolidone and 32.4 grams (0.81 mole) of sodium hydroxide in 300 milliliters of water was heated to and maintained at 90° C. for 16 hours thereby to convert more than 85% by weight of said poly vinyl-5-carboxymethyl-2-pyrrolidone to poly vinyl-5-sodium carboxylate-2-pyrrolidone. The resultant mass, known as Mass A, consisted essentially of an aqueous solution of said poly vinyl-5-sodium carboxylate-2-pyrrolidone (which may also exist as the ring opened poly-(N-vinyl glutamic acid disodium salt)), known as Product P–27 and methanol reaction by-product. The water and methanol are separated therefrom by evaporation under vacuum. The corresponding potassium and lithium salts may be produced by using potassium hydroxide and lithium hydroxide respectively as reactants in place of the sodium hydroxide.

EXAMPLES P–28 TO P–30.—PREPARATION OF POLYVINYL-5-CARBOXY-2-PYRROLIDONE BY HYDROLYSIS OF POLYVINYL-5-CARBOXYMETHYL-2-PYRROLIDONE (A) Forty-five grams (0.268 mole) of polyvinyl-5-carboxymethyl-2-pyrrolidone and 15.1 (0.142 mole) of proximately 15,000 was found to be insoluble in water. Treatment of 3 grams of the copolymer with 0.37 grams (.55 mole percent) of sodium hydroxide in 36 milliliters of water caused the polymer to dissolve after heating at 90° C. for one-half hour. The partially hydrolyzed copolymer, known as Product P–31, was diluted to approximately 5% concentration by addition of 24 milliliters of water and tested and found suitable as a soil anti-redeposition agent in the form of a sodium salt.

EXAMPLES P–32 AND P–33.—HYDROLYSIS OF (N-VINYL-5-CARBOXYMETHYL-2-PYRROLIDONE) AND (N-VINYL PYRROLIDONE) COPOLYMERS (A) A copolymer containing 22% by weight of N-vinyl-5-carboxymethyl-2-pyrrolidone with a molecular weight of 220,000 was hydrolyzed in aqueous sodium hydroxide. This was achieved as follows: 9.1 grams of said copolymer containing 0.0118 mole of methyl ester groups was dissolved in 79 milliliters of water and a solution of 0.48 gram (0.012 mole) of sodium hydroxide in 5 milliliters of water was added. The solution was heated at 90° C. for 16 hours. The clear solution which contained approximately 10% by weight of (N-vinyl-5-sodio carboxy-2-pyrrolidone) and (N-vinyl pyrrolidone) copolymer, known as Product P–32, was used directly for soil anti-redeposition.

(B) Eight grams (0.0236 mole) of methyl ester groups of said copolymer containing 50% by weight of N-vinyl-5-carboxymethyl-2-pyrrolidone was dissolved in a solution of 0.945 grams (0.0236 mole) of sodium hydroxide in 30 milliliters of water and heated at 90° C. for 4 hours. The solution was acidified with hydrochloric acid and evaporated to dryness. The solid residue was extracted with 50 milliliters of methanol and the polymer solution was separated from the salts by filtration. The solid polymer was isolated by addition of the solution to 400 ml. of diethyl ether. The yield of dried polymer, known as Product P–33, was 6.2 grams. Its neutralization equivalent was 550, equivalent to 57% hydrolysis of the methyl ester.

EXAMPLES P–34 AND P–35.—PREPARATION OF POLY VINYL PYROGLUTAMTIC ACID HYDRAZIDE

Five milliliters of 95% hydrazine were added to a solution of 1.0 gram of poly N-vinyl methyl pyroglutamate (molecular weight of 28,000) in 10 milliliters of ethanol. The mixture was allowed to stand for 64 hours in a room at 250 C. during which time most of the poly N-vinyl methyl pyroglutamate reacted with the hydrazine to become converted to poly N-vinyl pyroglutamic acid hydrazide. The hydrazide was precipitated out in the form of a solid by adding dropwise 300 milliliters of diethyl ether to said reaction mass. The solid hydrazide was then separated and recovered by filtration and dried under vacuum. The dry product, known as Product P–34, weighed 1.0 gram (quant. yield) of polymer.

Analysis for $(C_7H_{11}N_3O_2)_x$.—Calculated: N, 24.85. Found: N, 23.62.

Five grams of monomeric N-vinyl pyroglutamic acid hydrazide were dissolved in 15 milliliters of water and the solution was heated to 70° C. under an atmosphere of nitrogen. The polymerization catalyst, 0.05 gram of "ABIN" was added and heating was continued for 64 hours at 70° C. The solution was cooled to 25° C. and added dropwise to 150 milliliters of acetone whereupon the polymer precipitated out. The precipitate was filtered, washed with acetone, and dried under vacuum. The dry poly N-vinyl pyroglutamic acid hydrazide so produced and known as Product P–35, weighed 2.2 grams (43% yield) and 0.5% solution thereof in methanol had a reduced viscosity of 0.14 at 25° C.

EXAMPLE P–36.—COPOLYMERIZATION OF N-VINYL METHYL PYROGLUTAMATE AND MALEIC ANHYDRIDE

A mixture of 2.4 grams of N-vinyl methyl pyroglutamate (Product 1a), 0.6 grams of maleic anhydride, and 0.015 grams of "ABIN" was heated to and maintained at 40° C. for 64 hours and then at 60° C. for 24 hours, whereby a solid copolymer of N-vinyl methyl pyroglutamate and maleic anhydride was obtained. The copolymer was dissolved in 10 milliliters of acetone and the solution was added dropwise to 150 milliliters of diethyl ether whereupon 1.5 grams of the copolymer precipitated out. The copolymer was recovered by filtration and dried, and is known as Product P–36. The intrinsic viscosity of the copolymer was 0.90 measured in dimethyl formamide at 25° C. The copolymer contained 5.95% nitrogen indicating it contained 56.6% by weight of N-vinyl methyl pyroglutamate units.

EXAMPLE P–37.—PREPARATION OF COPOLYMER OF N-VINYL METHYL PYROGLUTAMATE AND STYRENE

Two and four-tenths grams of N-vinyl methyl pyroglutamate (Product 1a), 0.6 gram of styrene and 0.015 gram of "ABIN" catalyst were charged into a glass reactor and mixed together therein while under a blanket of nitrogen. The reactor was stoppered and the mass therein was heated to and maintained at 40° C. for 66 hours. Then the temperature of the mass was increased to and maintained at 60° C. for 24 hours to effect copolymerization of the components. The resultant mass was then dissolved in 20 cubic centimeters of methylene chloride. This solution was added dropwise to 200 milliliters of methanol whereupon the copolymer of N-vinyl methyl pyroglutamate and styrene was thrown out of solution. The copolymer was isolated and recovered by filtration, then washed with methanol and dried under vacuum. The copolymer so obtained weighed 1.8 grams (60% yield), known as Product P–37, had an intrinsic viscosity of 0.75 in dimethyl formamide. The percent carbon therein was determined and found to be 63.84% showing a 30% styrene content in the copolymer.

EXAMPLE P–38.—COPOLYMERIZATION OF N-ALLYL METHYL PYROGLUTAMATE AND METHYL METHACRYLATE COPOLYMER

A solution consisting of 3 grams of methyl methacrylate, 2 grams of N-allyly methyl pyroglutamate (Product 13) and 0.05 grams of "ABIN" catalyst was, while under a blanket of nitrogen, in a closed glass reactor, heated to and maintained at 48° C. for 22 hours, and then the temperature thereof was increased to 70° C. and the mass maintained at 70° C. for 2 hours to effect copolymerization. The mass was permitted to cool to room temperature at which time it was in the form of a hard and clear solid. This solid crude copolymer was dissolved in 10 milliliters of methyl ethyl ketone. This solution was added dropwise into 200 milliliters of methanol in a flask whereupon the copolymer precipitated out as a white solid which settled to the bottom of the flask. The liquid phase was decanted from the flask and then to the wet solid remaining therein there was added 100 milliliters of methanol. This mass was refluxed for about 10 minutes and then filtered to separate and recover the purified copolymer, which was solid, known as Product P–38 and being in 58% yield.

One gram of Product P–38 was dissolved in 9 milliliters of methylene chloride and this solution was added dropwise into 200 milliliters of methanol after which the so purified Product P–38 was recovered, dried and analyzed for nitrogen. The result obtained indicated that the copolymer contained 12.9% by weight of N-allyl methyl pyroglutamate.

EXAMPLE P–39.—COPOLYMERIZATION OF N-ALLYL (ALLYL PYROGLUTAMATE) AND METHYL METHACRYLATE COPOLYMER

A solution, consisting of 3 grams of methyl methacrylate, 2 grams of N-allyl (allyl pyroglutamate) (Product 15) and 0.05 gram of "ABIN" catalyst, while under a nitrogen blanket in a closed glass reactor, was heated to 48° C. and maintained at 48° C. for 22 hours and then the temperature thereof was increased to 70° C. and the mass was maintained at 70° C. for 2 hours to effect copolymerization. Then the crude copolymeric mass was permitted to cool to room temperature at which it was in the form of a clear gel or rubber like mass which was insoluble in dimethyl formamide, dimethyl sulfoxide or other but more common organic solvents. The crude polymeric mass was heated together with dimethyl formamide which caused the gel to become swollen and leached out unreacted and low polymers present therein. This mix was filtered and the copolymer was recovered as a soft gel which was combined with 100 milliliters of methanol and this mix was refluxed for 1 hour for further purification. Then the mix was filtered to recover the so purified copolymer which was dried under vacuum. The dry copolymer which was hard and solid, was pulverized with a mortar and pestle and again extracted with methanol as before and then dried. The purified copolymer so obtained was analyzed for nitrogen and the results indicated 19.4% by weight of N-allyl (allyl pyroglutamate) therein.

EXAMPLE P–40. — POLYMERIZATION OF 1,1'-METHYLENE BIS-(ALLYL PYROGLUTAMATE)

A mix consisting of 1 gram of 1,1'-methylene bis-(allyl pyroglutamate) (Product 16), and 0.01 gram of "ABIN" catalyst blanketed with nitrogen in a closed glass reactor, were heated to 150° C. and maintained at 150° C. for 10 minutes whereby homopolymerization was effected. The resulting homopolymer was solid at room temperature and was insoluble in water, acetone, toluene and ether. The monomeric material (Product 16) may be added to soya bean oil in amounts of 10–20% by weight thereof together with "ABIN" measuring 1% by weight of Product 16 therein. The mass either with or without and preferably with a volume of China wood oil equal to the combined volumes of Product 16 and soya bean oil may be employed as a coating medium for electrical coils and heated to set the same thereby to provide a protective coating therefor or encapsulant therefor.

The following examples are tests made with some of the polymers of this invention which reveal some of the characteristics thereof.

EXAMPLE S–1.—SOIL SUSPENSION EFFICACY OF POLY VINYL-5-SODIUM CARBOXYLATE-2-PYRROLIDONE

Soil suspension characteristic of (A) poly vinyl-5-sodium carboxylate-2-pyrrolidone was compared with the corresponding characteristics of (B) carboxy methyl cellulose, (C), (D), and (E) poly vinyl pyrrolidone having average molecular weights of 10,000, 160,000 and 360,000 respectively. The material (A) used had a molecular weight of 20,000 and was the partially hydrolyzed poly vinyl methyl pyroglutamate (Product P–27 of paragraph A under Examples P–27 to P–29) which was first reacted with sufficient sodium carbonate to convert only all of the carboxyl group therein into sodium carboxy groups.

*Test procedure.*—Twenty-three milliliters of a suspension containing 0.437 grams of Nuchar C 1000 N carbon black were placed in a 25 milliliter glass stopped graduated cylinder. Two milliliters of an aqueous solution of the polymer was added and the cylinder was vigorously shaken for 30 seconds. The suspension was observed, with the aid of a bright background light, and the time noted when separation of the suspension phase occurred. The following table shows the separation time of the suspended carbon black in said solutions containing the same percentages of said materials (A)–(E) respectively.

| Polymer | Percent in 25 ml. Test Suspension | Separation Time (Hours) |
|---|---|---|
| Blank | | 0.05 |
| A | .04 | 80.0 |
| A | .02 | 60.0 |
| A | .01 | 26.0 |
| A | .004 | 18.0 |
| B | .04 | 10.0 |
| B | .02 | 0.75 |
| B | .01 | 0.35 |
| B | .004 | 0.10 |
| C | .04 | 6.0 |
| C | .004 | 0.10 |
| D | .04 | 0.75 |
| E | .04 | 0.25 |

EXAMPLE S–2

Forty-two parts by weight of a copolymer consisting of equal parts by weight of N-vinyl pyrrolidone and N-vinyl methyl pyroglutamate and having an intrinsic viscosity in methanol of 1.08 and an average molecular weight of 250,000 were dissolved in 58 parts of water to provide a 42% aqueous solution thereof. The solution was cast on a glass plate and the water was evaporated therefrom thereby to provide a dry film which was clear and hard and exhibited good adhesion to the glass. The dry film is useful as a water-soluble protective medium which may be employed as a coating composition for pills, tablets and the like which are to be ingested.

EXAMPLE S–3

An aqueous solution consisting of 35 parts by weight of the copolymer used in Example S–2, 65 parts by weight of water and 5.25 parts by weight of glycerin were combined to form a clear solution. This solution was cast on a glass plate and evaporated to dryness, leaving behind a clear, hard film which was more flexible than the film of Example S–2.

EXAMPLE S–4

Ten parts by weight of a copolymer consisting of 45 parts by weight of N-vinyl methyl pyroglutamate and 55 parts by weight of acrylonitrile and having an intrinsic viscosity in dimethyl formamide of 5.3 and an average molecular weight of 140,000 was dissolved in 90 parts by weight of dimethyl formamide. The solution was cast on a glass surface and evaporated to dryness leaving behind a dry film which was clear, hard and flexible; had good strength and was water insoluble. The copolymer is useful as a water-insoluble coating and impregnating agent.

EXAMPLE S–5

The solubilities of certain copolymers in various solvents were determined and were set forth in the following table. The determinations were made with 0.1 gram of particular polymer specified in 10 milliliters of particular solvents specified at 25° C. The letters "I" and "S" mean insoluble and soluble respectively.

PRODUCTS

| Solvent | P–18 | P–15 | P–19 | P–20 | P–37 | P–22 | P–23 | P–25 |
|---|---|---|---|---|---|---|---|---|
| Water | S | S | I | I | I | I | I | I |
| Acetone | I | S | | S | S | S | I | S |
| Methanol | S | S | I | S | S | | I | S |
| Ether | I | I | | I | I | I | I | I |
| Methylene Chloride | | | I | | S | | S | S |
| Dimethyl Formamide | | | S | | | S | S | S |

The term "pyroglutamic acid" as employed herein is intended to mean L-, D- or mixtures of L- and D- pyroglutamic acid. It therefore is to be understood that all of the novel derivatives of pyroglutamic acid described in the description and claims, unless otherwise specified, are intended to mean such derivatives of L-, D- or mixtures of D- and L- pyroglutamic acid.

Since certain changes may be made in the specific invention disclosed herein without departing from the scope thereof, it is intended that all matter contained in the foregoing description shall be interpreted as illustrative and not in a limiting sense.

It is also to be understood that the following claims are intended to cover all of the generic and specific features of the invention herein described, and all statements of the scope of the invention, which as a matter of language might be said to fall therebetween.

We claim:

1. A compound having the formula

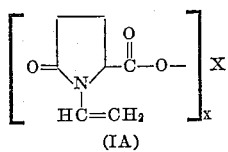
(IA)

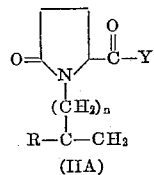
(IIA)

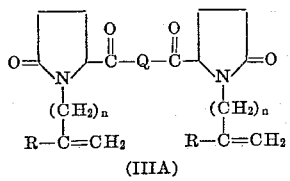
(IIIA)

and

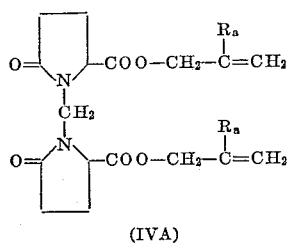
(IVA)

wherein each $n$ is independently selected from the group consisting of 0 and 1; when $n$ is 0, R is hydrogen; when $n$ is 1, each R is independently selected from the group consisting of hydrogen and methyl; each $R_a$ is independently selected from the group consisting of hydrogen and methyl;

X is a cation selected from the group consisting of hydrogen, ammonium, protonated amines, and a metal selected from the group consisting of sodium, potassium, lithium, silver, calcium, magnesium, barium, mercury, aluminum, iron, zinc, nickel, manganese and chromium; when X is hydrogen or ammonium, $x$ is 1; when X is a protonated amine, $x$ is an integer equal to the sum of the primary and secondary amine nitrogens; when X is a metal, $x$ is an integer equal to the valence of the metal;

Y is an amino group; and

Q is a divalent radical of a polyamine forming a diamide with the carbonyl groups.

2. A metal salt of N-vinyl pyroglutamic acid, with the metal selected from the group of metals consisting of sodium, potassium, lithium, silver, calcium, magnesium, barium, mercury, aluminum, iron, zinc, nickel, manganese, and chromium.

3. An amide of N-vinyl pyroglutamic acid.

4. N,N'-bis-(1-vinyl-pyroglutamoyl)-ethylene diamine.

5. An amine addition salt of N-vinyl pyroglutamic acid.

6. N-vinyl pyroglutamic acid.

7. N-vinyl sodium pyroglutamate.

8. N-vinyl potassium pyroglutamate.

9. N-vinyl lithium pyroglutamate.

10. N-vinyl ammonium pyroglutamate.

11. N-vinyl pyroglutamide.

12. N-vinyl pyroglutamic acid hydrazide.

13. N-vinyl pyroglutamic acid semicarbazide.

14. 1,1' methylene bis-(allyl pyroglutamate).

15. 1,1' methylene bis-(methallyl pyroglutamate).

16. A mixed allyl and methallyl diester of 1,1', bis methylene-pyroglutamic acid.

17. A compound of the formula

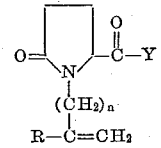

where $n$ is independently selected from the group consisting of 0 and 1; when $n$ is 0, R is hydrogen; when $n$ is 1, R is independently selected from the group consisting of hydrogen and methyl; Y is a radical selected from the group consisting of $-NH_2$, $-NHNH_2$, $-NHR_1$, $-N(R_1)_2$,
$-NHNHCONH_2$, $-NHR_2NH_2$, $-NHR_2NHR_1$,
$-NHR_2NHR_2NH_2$, $-NHOH$, $-NHR_2NH(R_2OH)$ where $R_1$ is a hydrocarbon radical having 1–18 carbon atoms and $R_2$ is selected from the group consisting of ethyl, propyl, and butyl.

References Cited

FOREIGN PATENTS 833,820    4/1960    Great Britain.

NICHOLAS S. RIZZO, *Primary Examiner.*

J. A. SEIDLECK, *Examiner.*

L. G. CHILDERS, J. TOVAR, *Assistant Examiners.*